United States Patent [19]

Pagendarm et al.

[11] Patent Number: 4,805,552
[45] Date of Patent: Feb. 21, 1989

[54] APPARATUS FOR REGULATING THE FLOW OF GASEOUS AND LIQUID MEDIA

[75] Inventors: Ralph Pagendarm, Halstenbek; Albert Hebels, Hamburg, both of Fed. Rep. of Germany

[73] Assignee: Pagendarm Beschichtungstechnik GmbH, Hamburg, Fed. Rep. of Germany

[21] Appl. No.: 116,442

[22] Filed: Nov. 3, 1987

[30] Foreign Application Priority Data

Nov. 4, 1986 [DE] Fed. Rep. of Germany ....... 3637452

[51] Int. Cl.$^4$ .......................... B05B 9/00; B05B 12/02
[52] U.S. Cl. .................................... 118/325; 222/512; 222/557; 138/43; 137/251.1; 137/205; 137/206; 427/420; 118/DIG. 4
[58] Field of Search ....................... 222/511, 512, 557; 138/43; 137/251.1, 205, 206; 427/420; 118/DIG. 4, 24, 325

[56] References Cited

U.S. PATENT DOCUMENTS

| | | | |
|---|---|---|---|
| 644,110 | 2/1900 | Steache | 137/251.1 |
| 1,491,529 | 4/1924 | Haeseler | 222/518 X |
| 3,419,038 | 12/1968 | Andresen | 137/504 |
| 3,523,559 | 8/1970 | Gibson | 138/46 |
| 4,075,976 | 2/1978 | Clayton | 427/420 X |

FOREIGN PATENT DOCUMENTS

| | | |
|---|---|---|
| 941334 | 4/1956 | Fed. Rep. of Germany . |
| 1049176 | 1/1959 | Fed. Rep. of Germany . |
| 1548932 | 1/1971 | Fed. Rep. of Germany . |
| 2438359 | 2/1975 | Fed. Rep. of Germany . |
| 3326227 | 3/1984 | Fed. Rep. of Germany . |
| 1128158 | 3/1960 | France . |
| 1424419 | 12/1965 | France . |

Primary Examiner—Shrive Beck
Attorney, Agent, or Firm—Peter K. Kontler

[57] ABSTRACT

Apparatus for regulating the flow of a fluid from a supply conduit at one end of an elongated housing to a nozzle having one or more orifices extending longitudinally of the housing has a partition which is installed in and divides the interior of the housing into a first compartment receiving fluid from the conduit and a second compartment communicating with the orifice or orifices of the nozzle. Two marginal portions of the partition are adjacent the bottom wall of the housing at opposite sides of the nozzle and define with the bottom wall a number of paths in the form of passages and/or channels for the flow of fluid from the first compartment into the second compartment. The inclination of the marginal portions of the partition relative to the bottom wall of the housing is adjustable by hand or by one or more motors to thereby select the rate of fluid flow along the respective path or paths.

20 Claims, 3 Drawing Sheets

Fig. 5

APPARATUS FOR REGULATING THE FLOW OF GASEOUS AND LIQUID MEDIA

CROSS-REFERENCE TO RELATED CASES

Apparatus of the present invention can be used to apply coating materials for the purposes set forth in the commonly owned copending patent application Ser. Nos. 103,421 and 111,403 filed Sept. 30, 1987 and Oct. 20, 1987, respectively.

BACKGROUND OF THE INVENTION

The invention relates to improvements in apparatus for regulating the flow of fluids, such as liquid and/or gaseous media. More particularly, the invention relates to improvements in apparatus for regulating the flow of gaseous or liquid media between separate compartments which are communicatively connected to each other to permit the fluid medium to flow between them along one or more predetermined paths.

It is well known to apply layers of adhesive and/or coloring material to running webs of paper, plastic or textile material, metallic foil or other substrates. Reference may be had to the aforementioned commonly owned copending patent application Ser. Nos. 103,421 and 111,403. As a rule, the layers are applied by means of nozzles having elongated slit-shaped orifices whose length corresponds to the width of a running web that is to be provided with a layer of fluid medium. The nozzle constitutes the outlet of a housing which can be said to act as a distributor of flowable material and receives such material by way of a supply conduit which is connected to a suitable source. The manner in which the flowable material is distributed in the housing on its way toward the orifice of the nozzle is not entirely satisfactory, especially if the orifice is long, because the rate of fluid flow to different portions of the orifice is affected by pressure losses and for a number of other reasons. Therefore, it is customary to regulate the flow of fluid medium from the inlet of the housing toward the orifice of the nozzle so as to ensure a predictable distribution of the fluid medium on the adjacent web. Heretofore known proposals to regulate the flow of fluid medium to different portions of an elongated slit-shaped orifice are unsatisfactory for a number of reasons including high cost, lack of versatility, unpredictable distribution, excessive bulk and/or others.

OBJECTS AND SUMMARY OF THE INVENTION

An object of the invention is to provide a simple, compact and inexpensive apparatus which can distribute the fluid medium in the interior of a housing in a predictable manner and for any desired periods of time.

Another object of the invention is to provide an apparatus which ensures predictable outflow of a fluid medium from one or more elongated slit-shaped orifices in the nozzle or nozzles serving to evacuate flowable material from a housing and to convert the outflowing material into a layer of desired thickness and width.

A further object of the invention is to provide an apparatus wherein the rate of outflow of fluid medium through different portions of one or more elongated orifices can be regulated with a heretofore unmatched degree of accuracy and wherein the rate of outflow can be varied while the apparatus is in use so that the thickness of the layer is uniform or varies in a prescribed manner longitudinally of the orifice or orifices.

An additional object of the invention is to provide an apparatus which can be installed in existing coating machines as a superior substitute for heretofore known and used apparatus.

Still another object of the invention is to provide the apparatus with novel and improved means for regulating the flow of a fluid medium between two internal compartments of a distributor in an apparatus which is used to coat a running web-like carrier with a layer of adhesive paste, coloring matter and/or other flowable media.

A further object of the invention is to provide a novel and improved method of compensating for pressure losses, for resistance to flow and for other unpredictable parameters which influence the rate of flow of a fluid medium from the inlet to the nozzle or nozzles of the distributor in the above outlined apparatus.

Another object of the invention is to provide the apparatus with novel and improved means for subdividing the internal chamber of a distributor into a plurality of compartments with the possibility of accurately metering the flow of fluid medium between the compartments.

The improved apparatus can be used to regulate the flow of a gaseous or liquid medium, for example, an adhesive coating material which contains a volatile solvent and is to be applied to a continuously running substrate of textile material, crepe paper, thermoplastic strip material, metallic foil or the like. The apparatus comprises a housing which defines an internal chamber and has a wall member bounding a portion of the chamber, and a partitioning member which is provided in the housing, which is adjacent the wall member and which divides the chamber into a first and a second compartment. The housing has means (such as a pipe or conduit which is connected to a source of gaseous or liquid medium by a pump) for admitting the medium into one of the compartments, and means (such as one or more nozzles having elongated orifices) for evacuating the medium from the other compartment. The two members define at least one path for the flow of the gaseous or liquid medium between the two compartments in a direction from the one compartment into the other compartment, and at least one of the members is movable relative to the other member to a plurality of different positions of inclination of the two members with reference to one another to thereby vary the effective cross-sectional area of the path and hence the rate at which the medium can flow between the compartments. In accordance with a presently preferred embodiment of the apparatus, the movable member is the partitioning member; however, it is also within the purview of the invention to connect the one wall member to the other wall member or members of the housing by a hinge and by suitable sealing means (e.g., by one or more membranes) so that the one wall member can be moved relative to the partitioning member or that each of these members can move relative to the other member in order to alter their mutual inclination and to thereby regulate the rate of flow of gaseous or liquid medium along the path from the one compartment into the other compartment. The partitioning member includes a preferably elongated marginal portion which is adjacent the one wall member in the region of the path, and such marginal portion can be provided with at least one passage (e.g., at least one hole, at least one dovetailed groove and/or at least one recess which is bounded in part by straight surfaces and in part by a concave surface) which forms part of the path. The marginal portion can be provided with one or more rows of neighboring passages which form part of a composite path having a plurality of portions distributed in the longitudinal direction of the marginal portion of the partition. Alternatively, or in addition to such passage or passages in the marginal portion of the partitioning member, the one wall member can be provided with at least one channel which is disposed in the region of the marginal portion of the partitioning member and forms part of the path. Each such channel has first and second ends which respectively communicate with the first and second compartments, and the movable member serves to obstruct the flow of gaseous or fluid medium through one end of the channel to a different extent in each position of inclination of the two members with reference to each other. The arrangement may be such that the obstruction is total in one end position and that the obstruction is negligible or nil in the other end position of the movable member relative to the other member. A median portion of each channel preferably extends transversely of the elongated marginal portion of the partitioning member.

The configuration of the aforementioned passage or passages and/or of the aforementioned channel or channels can be such that the width of the path for the flow of the gaseous or liquid medium varies transversely of the direction of flow of the medium from the one compartment into the other compartment.

The partitioning member can include a reversibly deformable panel which can be made (at least in part) of a suitable metallic sheet material. The partitioning member can include or constitute a substantially roof-shaped or trough-shaped panel with two mutually inclined sections and an elongated ridge-like joint between the sections. The aforementioned marginal portion, which preferably abuts the one wall member, is provided on one of the sections and is preferably parallel or substantially parallel to the ridge-like joint.

The apparatus can further comprise means for moving the one member relative to the other member, for example, for changing the inclination of the partitioning member relative to the one wall member at least in the region of the marginal portion of the partitioning member. The moving means can be designed in such a way that it is capable of changing the inclination of the partitioning member relative to the one wall member in the region of the path and to a different extent at each of a plurality of different locations longitudinally of the marginal portion of the partitioning member. For example, the moving means can comprise a plurality of inclination adjusting devices, at least one for each of the aforementioned locations as considered longitudinally of the marginal portion, and each such device is preferably actuatable independently of the other device or devices to select the inclination of a portion of the partitioning member at the respective location. The moving means can further comprise motor means for actuating the inclination adjusting devices (for example, discrete motor means for each inclination adjusting device or a single motor means connectable to selected inclination adjusting device or devices), and control means for the motor means (such control means can monitor the rate of flow of gaseous or liquid medium from different portions of the evacuating means and can be designed to generate signals which are used to regulate the rate of flow of fluid medium adjacent the corresponding part of the marginal portion of the partitioning member).

The moving means (or each inclination adjusting device of the moving means) can comprise a rotary input element (such as a knob or a motor) and motion transmitting means (such as a feed screw) for moving the one member between two end positions in response to rotation of the input element through a predetermined angle, preferably an angle of less than 361 degrees.

As mentioned above, the evacuating means can include nozzle means having at least one elongated discharge orifice for the gaseous or liquid medium, and such apparatus can further comprise means (e.g., one or more driven pulleys) for advancing a web of carrier material (e.g., an endless belt conveyor) past the nozzle means so that the medium which issues from the orifice or orifices forms a layer on the advancing web. The nozzle means can comprise a plurality of elongated orifices which extend substantially transversely of the direction of advancement of the web and at least two of which can be staggered relative to each other in the direction of advancement of the web.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
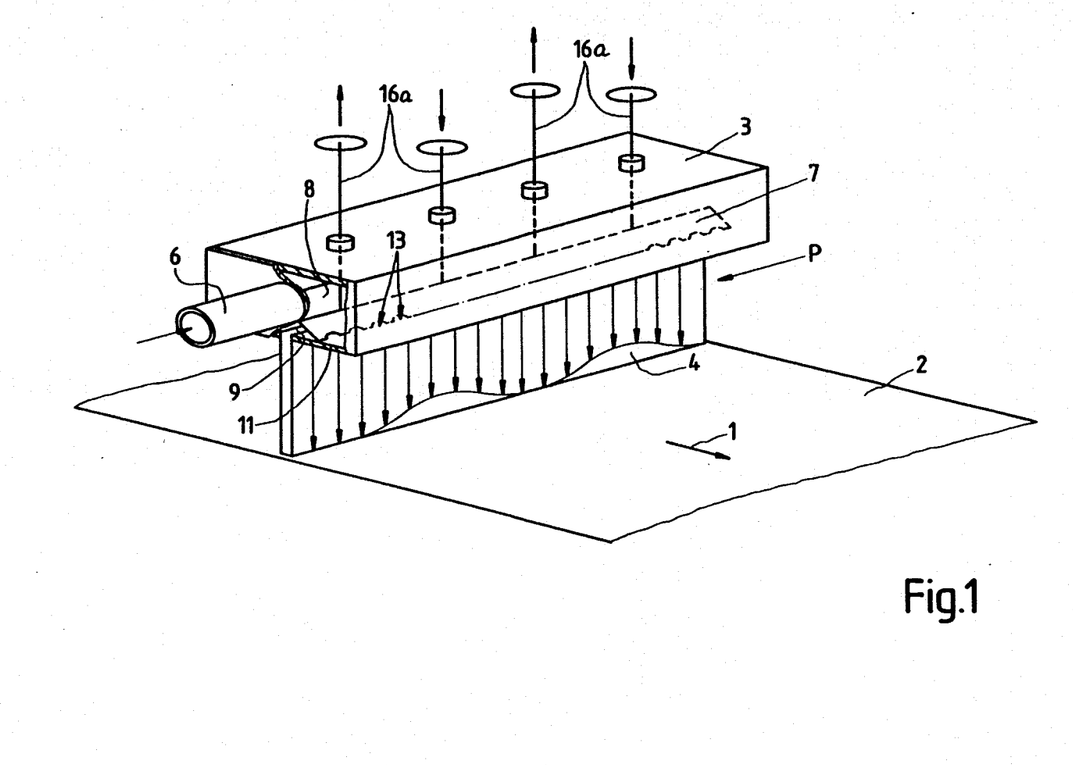
FIG. 1 is a perspective view of an apparatus which embodies one form of the invention, with a portion of the housing broken away.
Figure 2:
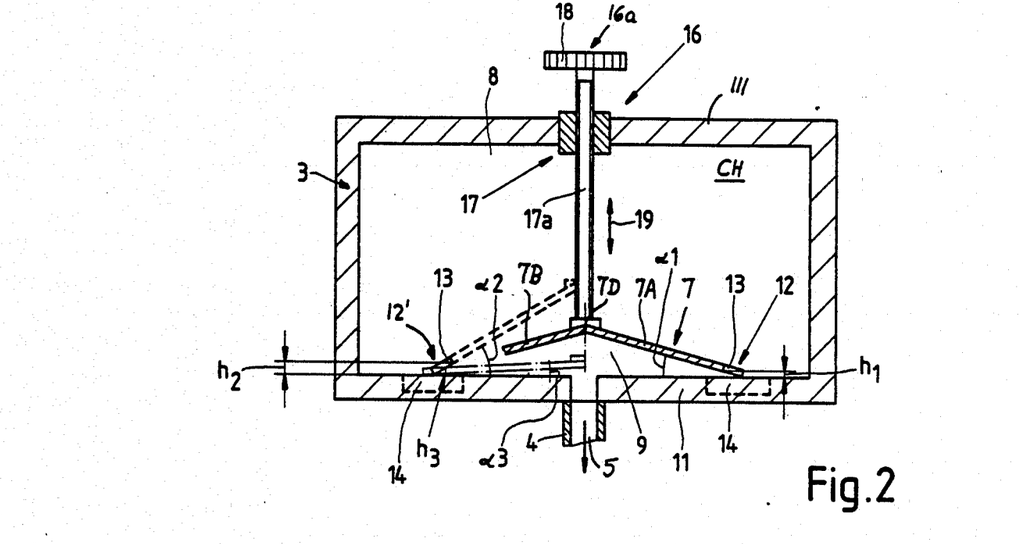
FIG. 2 is an enlarged transverse vertical sectional view of the apparatus, the mobile partitioning member being shown in three different positions.

Referring first to FIGS. 1 and 2, there is shown an apparatus which is used to regulate the flow of a gaseous or liquid medium (hereinafter called fluid for short) from a first compartment 8 into a second compartment 9 of the internal chamber CH in an elongated housing 3 constituting a distributor of fluid to all portions of an elongated slit-shaped or similar orifice 5 defined by an elongated nozzle 4 constituting a means for evacuating fluid from the compartment 9 of the housing 3. The means for admitting fluid into the compartment 8 of the housing 3 includes an elongated conduit 6 (e.g., a rigid pipe) whose inlet is connected to a suitable source (not shown) and wherein the fluid flows toward and into the compartment 8 due to elevated pressure which prevails in the source and/or under the action of a pump. The narrow stream of fluid which issues from the orifice 5 of the nozzle 4 forms a layer at the upper side of a web-like carrier 2 which is advanced in the direction of arrow 1 by one or more driven pulleys or the like (see the pulley 102 in FIG. 5), e.g., in a manner as disclosed in the aforementioned copending patent application Ser. Nos. 103,421 and 111,403. The conduit 6 discharges a continuous stream of fluid into one end portion of the elongated compartment 8, and a feature of the invention resides in the provision of novel and improved means for ensuring uniform or desired distribution of fluid along the full length of the housing 3 so that each and every portion of the orifice 5 discharges the fluid at the desired optimum rate. In the absence of any undertakings to compensate for losses of fluid pressure and flow, the distribution of pressure in the fluid along the nozzle 4 would be highly unsatisfactory, especially if the thickness of the layer of fluid on the running carrier 2 were to exhibit a predetermined profile. Thus, the pressure of fluid would be higher at the discharge end of the conduit 6 and would be less in the region of the right-hand end of the housing 3 (as seen in FIG. 1). This would normally result in the formation of a layer which is thicker along the left-hand marginal portion and whose thickness decreases in a direction toward the right-hand marginal portion of the carrier 2. In other words, the quantity of outflowing fluid would decrease in the longitudinal direction of the orifice 5, starting at the end of the orifice which is nearer to the discharge end of the conduit 6. Such distribution of fluid can accidentally conform to a desired distribution but, as a rule, deviates from the optimum distribution. For example, if the fluid is a liquid medium, it is often necessary to distribute such medium on the running carrier 2 in such a way that the moisture content per unit area, the thickness, the weight per unit area and/or certain other variable parameters will be uniform all the way from the one to the other marginal portion of the layer on the carrier 2. On the other hand, if the exposed surface of the carrier 2 is not uniform, it may be desirable to spread the fluid in such a way that the combined thickness of the fluid layer and of the corresponding stretch or reach of the web-like carrier will be constant all the way across the resulting laminate. As mentioned above, the ultimate product can constitute an adhesive tape or a continuous band aid wherein a substrate of textile material, thermoplastic strip material or the like carries a single layer or a composite layer which is applied in a manner as disclosed in the aforementioned copending patent applications. The uniformity of such products must be very pronounced so that it is important to ensure a highly uniform distribution of fluid on the carrier 2 irrespective of whether this layer constitutes the sole layer or one of several superimposed layers on the substrate. While the application of a uniform layer all the way across the carrier 2 already presents serious problems and cannot be readily achieved in heretofore known apparatus, the situation is further aggravated if the application of fluid onto the carrier must be carried out with a view to compensate for eventual slight, very slight, pronounced or very pronounced irregularities of the carrier.

In accordance with the invention, the flow regulating means comprises a partitioning member 7 (hereinafter called partition) which is installed in the chamber CH to divide the latter into the compartments 8, 9 and has an elongated straight marginal portion 12 extending in substantial or exact parallelism with the orifice 5 of the nozzle 4 and abutting the adjacent upper side of a bottom wall member 11 (hereinafter called bottom wall or wall) of the housing 3 in a manner as shown in FIG. 2. The illustrated partition 7 is a substantially roof-shaped panel of metallic sheet material which is elastic and can be repeatedly deformed to a predetermined extent without destroying its tendency to increase the angle between the two mutually inclined sections 7A, 7B of the panel. These sections are integrally connected to each other along a ridge-like joint 7D which is parallel to the marginal portion 12 as well as to a second marginal portion 12' of the partition 7. The marginal portions 12, 12' are respectively provided on the sections 7A, 7B of the panel which constitutes the partition 7.

The compartment 8 is much larger than the compartment 9. The latter is disposed between the upper side of the bottom wall 11 of the housing 3 and the undersides of the sections 7A, 7B, and the two compartments communicate with each other along several paths which extend transversely of the marginal portions 12, 12' and are but need not always be uniformly distributed in the longitudinal direction of the respective marginal portions. Each of the panels 7A, 7B makes with the bottom wall 11 of the housing 3 an acute angle alpha.

Figure 4A:
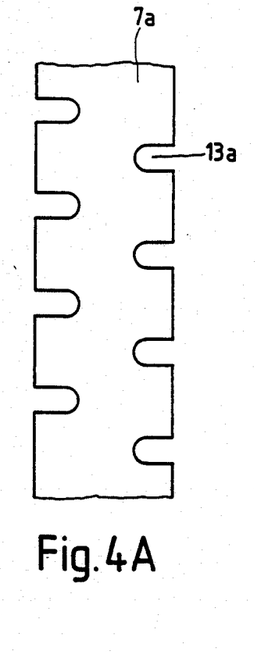
FIG. 4A is a fragmentary plan view of a third partitioning member.
Figures 4B, 4C:
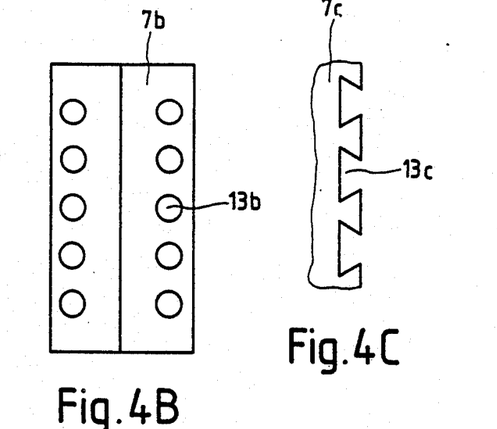
FIG. 4B is a plan view of a fourth partitioning member.
FIG. 4C is a fragmentary plan view of a fifth partitioning member.

The marginal portions 12, 12' of the panels 7A, 7B are formed with passages 13 (e.g., in the form of recesses 13a shown in the panel 7a of FIG. 4A and bounded by substantially U-shaped surfaces each having two parallel portions and a concave portion between the parallel portions; in the form of circular or otherwise configurated holes 13b shown in the panel 7b of FIG. 4B; or in the form of dovetailed recesses 13c provided in the panel 7c of FIG. 4C), and such pasages form part of the path for the flow of fluid from the compartment 8 into the compartment 9 when the apparatus of FIG. 1 is in use, i.e., when the conduit 6 delivers a stream of fluid into the compartment 8 and the nozzle 4 evacuates a layer of fluid from the compartment 9. In addition to or in lieu of the just discussed passages 13, the path between the compartments 8, 9 can include a plurality of channels 14 which are machined into or are otherwise formed in the upper side of the bottom wall 11 and extend transversely of the marginal portions 12, 12' of the partition 7. Each such channel 14 has a first end which communicates with the compartment 8, a second end which normally communicates with the compartment 9, and a median portion which crosses the respective marginal portion 12, 12'. The composite path which includes the passages 13 and the channels 14 allows the fluid to flow from the compartment 8 into the compartment 9 at a rate which is determined by mutual inclination of the sections 7A, 7B and more particularly by the inclination of marginal portions 12, 12' relative to the adjacent portions of the bottom wall 11 of the housing 3. The panel which constitutes the partition 7 is reversibly deformable by a moving means 16 which serves to increase the obtuse angle between the sections 7A, 7B or which allows for a reduction of such obtuse angle, depending upon whether the rate of fluid flow from the compartment 8 into the compartment 9 is to be reduced or increased.

As shown in FIG. 2 by solid lines for the section 7A, the angle alpha$_1$ which is defined by the section 7A and the bottom wall 11 is a relatively small acute angle so that the effective cross-sectional area of the path for the flow of fluid into the compartment is rather small (the topmost portions of the passages 13 in the marginal portion 12 are located at a level $h_1$ above the upper side of the bottom wall 11). The fluid is then free to flow through the two rows of passages 13 (the inclination of the left-hand section 7B is the same or practically the same as that of the section 7A) as well as through the channels 14. The rate of fluid flow through those ends of the channels 14 which are overlapped by the marginal portions 12, 12' (i.e., which communicate or are to communicate with the compartment 9) is obstructed to a different extent in each angular position of the sections 7A, 7B with reference to the bottom wall 11. Thus, when the angle $alpha_1$ is reduced to $alpha_3$ (the corresponding position of the section 7B is indicated in FIG. 2 by phantom lines), the marginal portion 12' completely or nearly completely obstructs the flow of fluid by way of the respective row of channels 14 and the rate of flow of fluid through the passages 13 in the marginal portion 12' is zero or close to zero (note the minimal distance $h_3$ between the topmost portions of the channels 13 and the bottom wall 11) so that the partition 7 then acts not unlike a shutoff valve and completely or nearly completely seals the compartments 8 and 9 from each other. The rate of fluid flow into the compartment 9 is increased considerably if the moving means 16 allows the sections 7A, 7B of the partition 7 to assume the positions corresponding to that shown in FIG. 2 by broken lines (angle $alpha_2$) in which the topmost portions of the passages 13 are located at a rather great distance $h_2$ from the upperside of the bottom wall 11. The marginal portions 12, 12' then do not obstruct, or obstruct only negligibly, the flow of fluid from the channels 14 into the compartment 9 so that the latter receives large quantities of fluid per unit of time.

The marginal portions 12, 12' of the sections 7A, 7B are but need not be mirror symmetrical to each other with reference to a plane which halves the orifice 5 of the nozzle 4 and extends at right angles to the plane of FIG. 2. Such symmetry plane also includes the ridge-like joint 7D between the sections 7A, 7B. If desired, the marginal portions 12, 12' can carry elongated sealing elements or friction reducing elements to enhance the sealing action between the compartments 8, 9 (i.e., to confine the flow of fluid to that flow which is permitted by the selected path including the passages 13 and channels 14) or to reduce the wear upon the marginal portions and the wall 11.

The moving means 16 can include a battery of discrete adjusting or inclination selecting devices 16a each of which can be actuated to select the inclination of a corresponding portion of each of the marginal portions 12, 12' relative to the bottom wall 11. The locations of individual inclination selecting devices 16a of the moving means 16 can be uniformly or non-uniformly spaced apart from one another in the longitudinal direction of the nozzle 4 and its orifice 5. Each inclination selecting device 16a of the moving means 16 can include a vertical feed screw 17a mating with a nut 17 in the top wall 111 of the housing 3 and carrying at its upper end an input element in the form of a knob or wheel 18 which can be manipulated by hand to cause the shank of the feed screw 17a to move up or down (note the double-headed arrow 19) and to move the joint 7D nearer to the bottom wall 11 or to permit the innate elasticity of the partition 7 to move its joint 7D above and away from the bottom wall 11. This results in automatic regulation of the rate of flow of fluid through the corresponding portion of the path between the compartments 8 and 9, i.e., through the adjacent passages 13 and channels 14. The knobs 18 can be used to move the respective feed screws 17a to any one of a practically infinite number of positions in each of which the rate of fluid flow along the corresponding portions of the path between the partitions 8, 9 assumes a particular value. The partition 7 is movable between two end positions in one of which (note the angle $alpha_3$ in FIG. 2) the rate of fluid flow is minimal or zero and in the other of which (e.g., in that indicated in FIG. 2 by broken lines) the rate of fluid flow is maximal. In order to simplify the adjustment, the pitch of the thread on each of the feed screws 17a can be selected in such a way that a single revolution of the respective knob 18 suffices to move the corresponding portions of the sections 7A, 7B between their two end positions. The knobs 18 can carry suitable indicia cooperating with a stationary marker on the top wall 111 or elsewhere on the housing 3 so as to enable the operator to accurately select the inclination of the corresponding parts of the marginal portions 12, 12' relative to the bottom wall 11. In other words, the knobs 18 need not be turned through more than 360 degrees.

If desired or necessary, the compartment 9 can contain one or more springs which react against the bottom wall 11 and bear against the partition 7 to maintain the joint 7D in contact with the lower end portions of the feed screws 17a. Alternatively or in addition to such springs, it is possible to provide in the compartment 8 one or more springs or other suitable biasing means for pulling the joint 7D against the lower end portions of the feed screws 17a. All that counts is to ensure that each and every adjustment of a selected portion of the partition 7 by means of the corresponding feed screw 17a will invariably result in an expected selection of the rate of fluid flow along the corresponding portions of the path between the compartments 8 and 9. It has been found that the illustrated moving means 16 renders it possible to select the rate of fluid flow into selected portions of the compartment 9 with a very high degree of accuracy.

FIG. 1 shows, by way of example, that the moving means 16 can include a total of four exactly or substantially equidistant inclination selecting devices 16a which form a row extending along the ridge-like joint 7D between the sections 7A, 7B of the partition 7, i.e., in parellelism with the nozzle 4. FIG. 1 further shows one (P) of numerous pressure profiles which can be selected by appropriate adjustment of the feed screws 17a to determine the distribution of fluid pressures along the nozzle 4. Such pressure profile will be selected if the upper side of the web-like carrier 2 beneath the nozzle 4 has a rather pronounced undulate shape which should be compensated for by appropriate selection of the thickness of corresponding portions of the layer of fluid medium issuing from the orifice 5. As mentioned above, the moving means 16 renders it possible to select a desired pressure profile with a very high degree of accuracy. It is clear that the number of discrete individually actuatable inclination selecting devices 16a can be reduced to three, two or one or increased to five or more without departing from the spirit of the invention. Moreover, the mutual spacing of neighboring devices 16a can be greater or less in the middle and less or greater at the ends of the nozzle 4, depending on the nature of desired pressure profiles and on the configuration of the web-like carrier 2.

Figure 3:
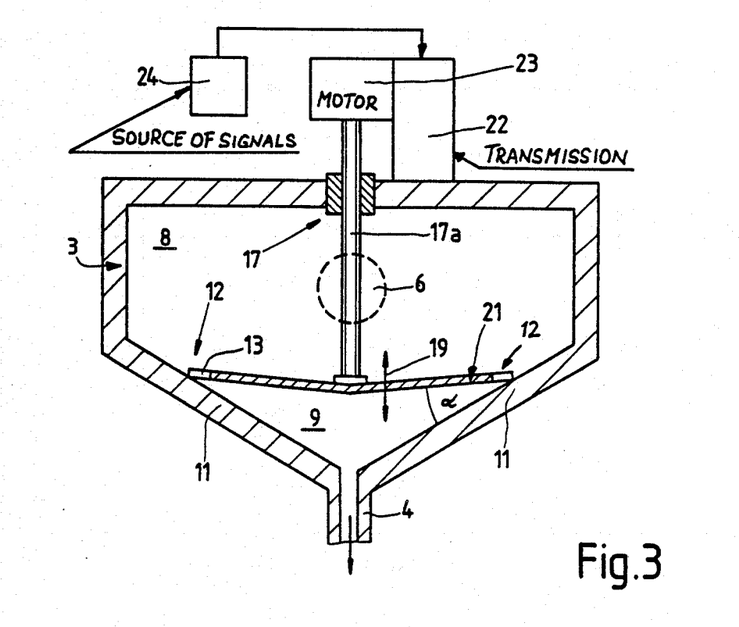
FIG. 3 is a similar transverse vertical sectional view but showing a modified partitioning member and motorized means for moving the partitioning member.

FIG. 3 shows a portion of a modified apparatus wherein all such parts which are identical with or clearly analogous to corresponding parts of the apparatus of FIGS. 1-2 are denoted by similar reference characters. The chamber of the housing 3 is divided into 5 compartments 8, 9 by a modified partition 21 which is a sheet metal panel and (in the illustrated stage of deformation) resembles an inverted roof-shaped body. The material of the partition 21 is reversibly deformable and tends to flatten out or to assume the shape of a non-inverted roof so that it continuously bears against the lower end portion or portions of one or more feed screws 17a. It is clear that the partition 7 or 21 can also be made of other materials, such as a plastic material or a combination of two or more different materials, as long as it exhibits the required elasticity and can stand the chemical and/or other potentially corrosive action of a fluid, e.g., an aggressive gaseous or liquid medium which is to be applied to the running web 2 (not shown in FIG. 3). The illustrated angle alpha between one section of the partition 21 and the adjacent inclined portion of the bottom wall 11 of the housing 3 is a relatively large acute angle, i.e., the marginal portions 12, 12' of the partition 21 do not appreciably obstruct the flow of fluid through the passages 13 which are provided in the marginal portions and form part of the path along which the fluid can flow from the compartment 8 into the compartment 9 when the conduit 6 supplies a stream of fluid and such fluid is to issue by way of the orifice of the nozzle 4 in order to form a layer on the adjacent running web of suitable carrier material. The angle alpha can be reduced to a fraction of the illustrated value by causing the feed screw or feed screws 17a to move downwardly and to impart to the partition 21 a more pronounced inverted roof-shaped configuration. The two mutually inclined portions of the bottom wall 11 of the housing 3 may but need not always be provided with channels corresponding to the channels 14 shown in FIG. 2.

FIG. 3 further shows an input element in the form of a motor 23 which replaces the knobs 18 of FIGS. 1-2 and serves as a means for rotating the respective feed screw or feed screws 17a in a clockwise or in a counterclockwise direction in response to signals from a control means 22. The latter receives signals from a source 24 of reference signals, e.g., from a device having means for monitoring the thickness of the layer which issues from the orifice of the nozzle 4 and/or the thickness of the running web beneath the nozzle 4. The control means 22 can constitute or include a suitable transmission. The motor 23 can constitue a stepping motor which can turn the selected feed screw or feed screws 17a through desired angles, e.g., between 0 and 360 degrees, in order to move the partition 21 to a first end position, to a second end position or to any one of a large or infinite number of intermediate positions.

Referring again to FIGS. 4A, 4B and 4C, it will be seen that the passages may but need not be provided in the outermost parts of the respective marginal portions. Thus, the passages 13b are openings which are completely surrounded by the material of the respective partition 7b. On the other hand, the passages 13a and 13c are open recesses or slots. The configuration of the passages 13b and 13c is such that they cause the rate of fluid flow therethrough to vary in the longitudinal direction of the orifice of the respective nozzle, i.e., at right angles to the direction (arrow 1 in FIG. 1) of advancement of the web 2 along the lower end of the nozzle 4. This renders it possible to even more accurately and predictably influence the rate of fluid flow in response to changes in inclination of the marginal portions of the partition 7b or 7c relative to the adjacent bottom wall 11.

Figure 5:
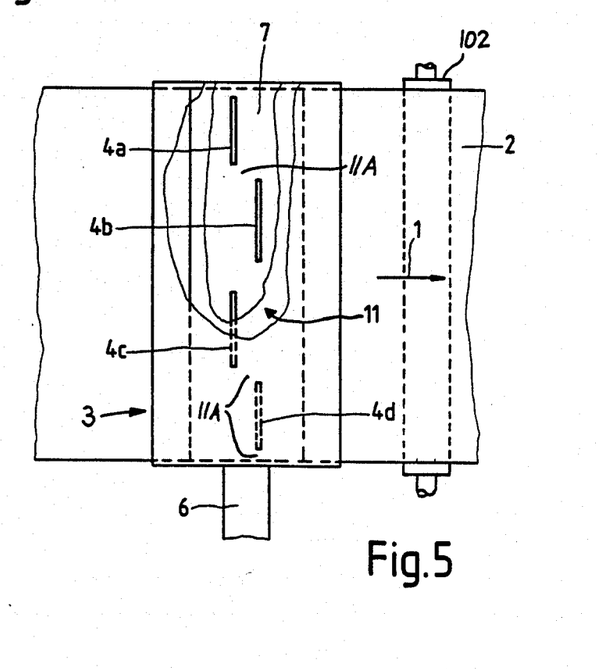
FIG. 5 is a schematic plan view of a modified apparatus wherein the nozzle means has several orifices which are staggered relative to each other in the direction of advancement of a web to be provided with a layer of fluid medium issuing from the orifices.

FIG. 5 shows that the second compartment of the housing 3 can communicate with the orifices of several nozzles 4a, 4b, 4c, 4d each of which extends in the longitudinal direction of the housing (i.e., transversely of the direction (arrow 1) of advancement of the web 2). The nozzles 4a, 4b are respectively aligned with the nozzles 4c, 4d, and the nozzles 4a, 4c are staggered with reference to the nozzles 4b, 4d in the direction of arrow 1. The composite nozzle of FIG. 5 will be utilized if the manufacturer wishes to avoid undue weakening of the bottom wall 11 of the housing 3, i.e., if the maker of the apparatus desires to provide reinforcing webs 11A which extend transversely of the composite nozzle (i.e., in the direction of arrow 1) between neighboring nozzles 4a-4d as well as between the outermost nozzles 4a, 4d and the adjacent end walls of the housing 3. If desired or necessary, all of the nozzles 4a-4d can be aligned with each other transversely of the arrow 1, all of the nozzles 4a-4d can be staggered relative to each other in the direction of arrow 1, or the composite nozzle can comprise two, three, five or more discrete nozzles. The manner in which the rate of fluid flow through individual nozzles 4a-4d of the apparatus of FIG. 5 can be regulated is or can be the same as described in connection with FIGS. 1-2 or in connection with FIG. 3, i.e., the configuration or inclination of the partition 7 relative to the bottom wall 11 of the housing 3 of FIG. 5 can be changed by a set of mutually adjustable inclination adjusting devices 16a or by one or more motorized inclination adjusting devices.

Each of the illustrated apparatus can be supplied with two or more partitions so that the operator can rapidly change the pressure pattern by the simple expedient of replacing a first partition having a first set of passages or no passages with a second partition having a different second set of passages or no passages. The door or doors which are provided in the housing to allow for insertion or removal of a partition are not shown in the drawing. It is further clear that the marginal portions of a partition which is to be used in the improved apparatus need not be provided with any passages if the number and dimensions of the channels 14 are selected in such a way that these channels permit the flow of fluid at the maximum required rate as well as at the prescribed minimum rate (e.g., zero).

It is further possible to design a partition in such a way that only one of its marginal portions has passages for the flow of fluid between the compartments 8 and 9. Alternatively, one of the marginal portions 12, 12' can be provided with one or more passages 13 and the other marginal portion (which is devoid of passages) can extend across channels (such as those shown at 14 in FIG. 2) in the adjacent portion of the bottom wall 11. Still further, the material of the partition can be selected in such a way that the partition is elastic at locations which are remote from the joint between the two panels and also remote from the respective marginal portions, i.e., that the partition comprises a rigid central portion, two rigid marginal portions and an elastic portion between the rigid central portion and each rigid marginal portion. Partitions of the type shown in FIGS. 2 and 3 are preferred at this time because they can be deformed (with resultant adjustment of inclination of their marginal portions 12, 12' relative to the bottom wall 11) in a simple and predictable manner and by resorting to relatively simple moving means. The roof-shaped partitions 7, 21 can be replaced with substantially trough- or shell-shaped partitions having a substantially semicircular shape, i.e., with a convex outer side and a concave inner side. As used herein, the term "roof-shaped" is intended to embrace truly roof-shaped as well as trough- or shell-shaped partitions.

The housing 3 can constitue a modified distributor of the type used in heretofore known coating and like apparatus.

In the illustrated embodiments of the improved apparatus, the marginal portions of the partitions 7, 21 simply abut the adjacent surfaces of the respective bottom walls 11. However, it is equally possible to pivotally connect at least one marginal portion of each partition to the respective bottom wall and to employ moving means which pushes as well as pushes the partition down or up, i.e., the partition need not always be made of an elastic material so that it would automatically tend to assume a predetermined shape. For example, each of the marginal portions 12, 12' can be articulately connected to the adjacent bottom wall 11 by a hinge which defines an elongated pivot axis and is movable toward and away from the respective nozzle 4 or 4a–4d. The moving means for a nonelastic partition can also include one or more feed screws or analogous parts which must be rotated through less than 361 degrees in order to move the partition from the one to the other end position or vice versa. This brings about the aforediscussed advantages, i.e., it is relatively simple to select a desired rate of fluid flow between the compartments 8, 9 of the housing 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for regulating the flow of a gaseous or liquid medium, comprising a housing defining an internal chamber and having a wall member bounding a portion of said chamber; a partitioning member provided in said housing, adjacent said wall member and dividing said chamber into a first compartment and a second compartment, said housing having means for admitting the medium into one of said compartments and means for evacuating the medium from the other of said compartments, said evacuating means including nozzle means having at least one elongated discharge orifice for the medium, said members defining at least one path for the flow of the medium between said compartments in a direction from said one compartment into said other compartment and at least one of said members being movable relative to the other of said members to a plurality of different positions of inclination of said members with reference to one another to thereby vary the effective cross-sectional area of said path and hence the rate at which the medium can flow between said compartments; and means for advancing a web of carrier material in a predetermined direction past said nozzle means so that the medium issuing from said orifice forms a layer on the advancing web.

2. The apparatus of claim 1, wherein said nozzle means has a plurality of elongated orifices which extend transversely of said predetermined direction and include at least two orifices which are staggered with reference to each other in said predetermined direction.

3. Apparatus for regulating the flow of a gaseous or liquid medium, comprising a housing defining an internal chamber and having a wall member bounding a portion of said chamber; a partitioning member provided in said housing, adjacent said wall member and dividing said chamber into a first compartment and a second compartment, said housing having means for admitting the medium into one of said compartments and means for evacuating the medium from the other of said compartments, said members defining at least one path for the flow of the medium between said compartments in a direction from said one compartment into said other compartment and at least one of said members being movable relative to the other of said members to a plurality of different positions of inclination of said members with reference to one another to thereby vary the effective cross-sectional area of said path and hence the rate at which the medium can flow between said compartments; and means for moving said one member relative to said other member.

4. The apparatus of claim 3, wherein said partitioning member has a marginal portion adjacent said wall member, said wall member having at least one channel disposed in the region of said marginal portion and forming part of said path.

5. The apparatus of claim 4, wherein said channel has first and second ends which respectively communicate with said first and second compartments, said at least one member being arranged to obstruct the flow of the medium through one end of said channel to a different extent in each of said different positions of inclination of said members with reference to one another.

6. The apparatus of claim 5, wherein said marginal portion is elongated and said channel has a median portion extending transversely of said marginal portion.

7. The apparatus of claim 3, wherein said members define at least one path the width of which varies transversely of said direction.

8. The apparatus of claim 3, wherein said partitioning member comprises a reversibly deformable panel having a marginal portion adjacent said path, said partitioning member constituting said movable member.

9. The apparatus of claim 8, wherein said marginal portion is elongated and extends substantially transversely of said direction.

10. The apparatus of claim 8, wherein said panel is substantially roof-shaped or trough-shaped and includes two mutually inclined sections and a ridge-like joint connecting said sections, said marginal portion being provided on one of said sections.

11. The apparatus of claim 3, wherein said movable member is said partitioning member.

12. The apparatus of claim 3, wherein said partitioning member comprises a metallic sheet material.

13. The apparatus of claim 3, wherein said partitioning member includes a marginal portion adjacent said wall member and said marginal portion has at least one passage forming part of said path.

14. The apparatus of claim 3, wherein said partitioning member has an elongated marginal portion adjacent said wall member in the region of said path, said evacuating means including nozzle means extending substantially longitudinally of said marginal portion and said moving means including means for changing the inclination of said partitioning member with reference to said wall member, at least in the region of said marginal portion.

15. The apparatus of claim 3, wherein said partitioning member has an elongated marginal portion in the region of said path, said moving means including means for changing the inclination of said partitioning member relative to said wall member in the region of said path to a different extent at a plurality of locations as seen longitudinally of said marginal portion.

16. The apparatus of claim 15, wherein said moving means includes a plurality of inclination adjusting devices, at least one for each of said locations and each actuatable independently of the other devices to select the inclination of the partitioning member at the respective location.

17. The apparatus of claim 16, further comprising motor means for actuating said inclination adjusting devices and control means for said motor means.

18. The apparatus of claim 3, wherein said moving means includes a rotary input element and means for moving said one member between two end positions in response to rotation of said input element through an angle of less than 361 degrees.

19. Apparatus for regulating the flow of a gaseous or liquid medium, comprising a housing defining an internal chamber and having a wall member bounding a portion of said chamber; and a partitioning member provided in said housing, adjacent said wall member and dividing said chamber into a first compartment and a second compartment, said housing having means for admitting the medium into one of said compartments and means for evacuating the medium from the other of said compartments, said members defining at least one path for the flow of the medium between said compartments in a direction from said one compartment into said other compartment and at least said partitioning member being movable relative to said wall member to a plurality of different positions of inclination of said members with reference to one another to thereby vary the effective cross-sectional area of said path and hence the rate at which the medium can flow between said compartments, said partitioning member comprising a reversibly deformable panel having a marginal portion adjacent said path, said panel being substantially roof-shaped or trough-shaped and including two mutually inclined sections and a ridge-like joint connecting said sections, said marginal portion being provided on one of said sections.

20. The apparatus of claim 19, wherein said marginal portion and said joint are elongated and substantially parallel to each other.

* * * * *